May 10, 1949.    E. M. O'DONNELL    2,469,514
COMBINATION TELESCOPING TRACTOR
AND HORSE DRAWN HITCH
Filed March 14, 1946
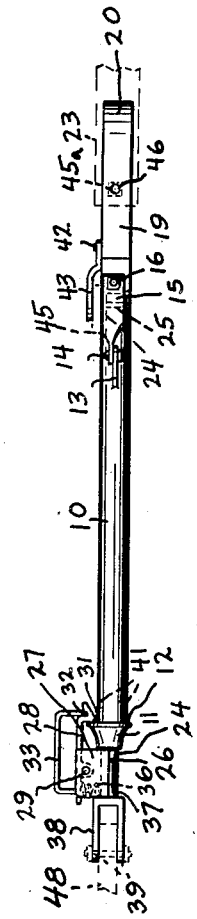
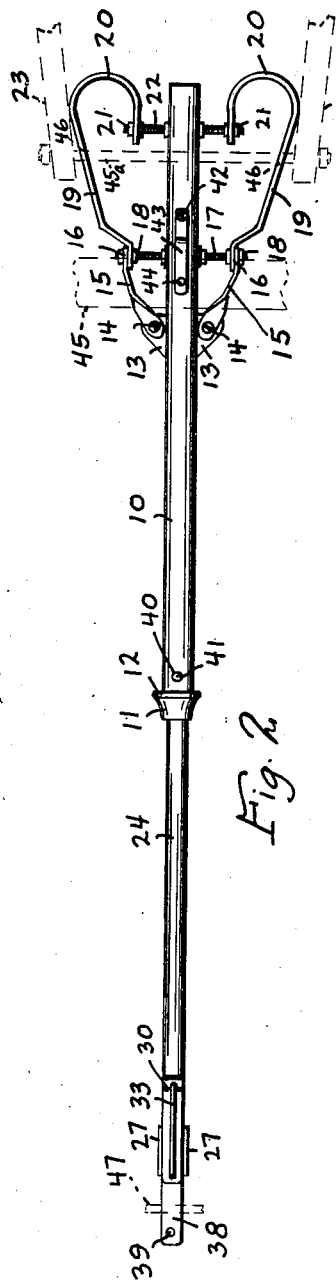
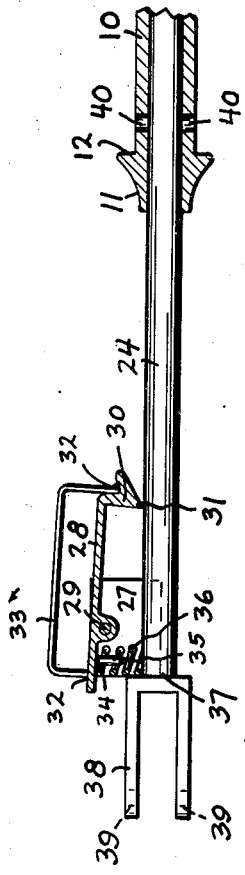
INVENTOR.
Edward M. O'Donnell
BY
*Sam J. Slotsky*
ATTORNEY Patented May 10, 1949

2,469,514

UNITED STATES PATENT OFFICE 2,469,514

COMBINATION TELESCOPING TRACTOR AND HORSE-DRAWN HITCH

Edward M. O'Donnell, Galva, Iowa

Application March 14, 1946, Serial No. 654,450

5 Claims. (Cl. 278—33)

My invention pertains to a hitch usable for tractors or for horse drawn arrangements.

An object of my invention is to provide a hitch which can be attached to any type of tractor for drawing purposes, and which can be extended to be used as a tongue for horse drawn purposes.

A further object of my invention is to provide an arrangement which will allow convenient attachment to a tractor regardless of the position of the tractor, and which will then be firmly secured, automatically upon reverse motion of the tractor.

A further object of my invention is to provide all of the above objects in a simple construction.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the hitch as used on a tractor,

Figure 2 is a plan view of Fig. 1 showing the arrangement used as a horse drawn device, and Figure 3 is an enlarged detail.

I have used the character 10 to designate a pipe to which is attached the integral extending sloping portion 11 having the shoulder 12. Attached to the member 10 are the ears 13 to which are attached at 14 the twisted straps 15 which are attached at 16 to the lengthened stud 17 to which is threadably engaged the nuts 18. Also attached to the stud are the further strap members 19 which are looped at 20 and are attached by means of the nuts 21 to the threaded stud 22. This latter described structure is adapted to be received between the forwardly extending members 23 which are the usual members attached to the front axle of a wagon, the threaded studs 17 and 22 providing means for adjusting the straps 15 and 19 inwardly or outwardly to receive varied spaces between the members 23.

Received within the pipe 10 is a lengthened rod 24 which includes an opening 25 at the end thereof, and attached at the other end of the rod 24 at 26 are a pair of bracket members 27 between which members is received a rockable lever 28, a pin 29 passing through the lever 28 and the members 27. The member 30 terminates in the point 31, and attached at 32 to the member 28 is the grasping member 33. Attached to the lever 28 at 34 is a guide pin 35 which is received within a helical compression spring 36. Attached at 37 to the end of the rod 24 is a substantially U-shaped yoke 38 having the openings 39. The female pipe 10 includes the openings 40.

When the arrangement is to be used in horse drawn equipment, the male rod 24 is pulled out until the opening 25 registers with the openings 40, and the pin 41 (see Fig. 2) is placed through these openings whereby the arrangement will be in the extended position shown in Fig. 2. Attached at 42 to the pipe 10 is the member 43 having an opening 44. The evener of the horse drawn arrangement, which is indicated by the character 45 is placed beneath the member 43 and secured through the opening 44. The members 23 are secured by the use of the lengthened rod 45a passing through the openings 46 etc. The rings, which are indicated by the character 47, of the yokes are placed within the member 38, and the horses being positioned on either side of the pipe 10 and rod 24 will then draw the entire arrangement, the single-trees being attached to the evener in the usual manner.

When it is desired to draw the wagon or similar arrangements by means of a tractor the pin 41 is removed, and the member 38 is attached to the tractor draw bar 48 or any other part of the tractor as desired. The attachment can be made substantially any distance from the tractor or the wagon without requiring exact positioning of the telescoping members. This is due to the fact that the yoke 38 can be attached to the tractor draw bar, with the members 23 or any other similar members being attached as explained above, and with the rod 24 being pulled out to any distance. The tractor is then backed in the direction of the arrow 49 until the point 31 of the lever member 28 slides up over the member 11 and then snaps over the shoulder 12 to the position shown in Fig. 1.

As the tractor drives forwardly again the wagon will be drawn forwardly also, due to the solid retention of the point 31 behind the shoulder 12. The spring 36 provides a positive engagement, and the member 33 permits manual pivoting of the member 28 for release.

It will now be seen that I have provided the advantages mentioned in the objects of my invention, with further advantages being readily apparent.

Some changes may be made in the construction and arrangement of the parts of my invention without departing from the real spirit and purpose of my invention, and it is my intention to cover by my claims and modified forms of structure or use of mechanical equivalents which may be reasonably included within their scope.

I claim as my invention:

1. A combination telescoping tractor and horse drawn hitch comprising a female tube, means for attaching a drawn vehicle to said tube, a male rod received in said female tube, means for locking said male rod to said tube after extension of the rod to provide a lengthened horse drawn tongue, means for engaging the rod with said tube when said rod is thrust into said tube, including a shouldered member attached to the end of said tube, a spring urged lever member including a shoulder engaging member attached to the rod, said rod including means for attachment to a tractor.

2. A combination telescoping tractor and horse drawn hitch comprising a female tube, means for attaching a drawn vehicle to said tube, a male rod received in said female tube, means for locking said male rod to said tube after extension of the rod to provide a lengthened horse drawn tongue, means for engaging the rod with said tube when said rod is thrust into said tube, including a shouldered member attached to the end of said tube, a spring urged lever member including a shoulder engaging member attached to the rod, said rod including means for attachment to a tractor, said shouldered member having a sloping surface whereby inward thrusting of the rod will cause said shoulder engaging member to travel along said surface and to snap into locking engagement with said shouldered member.

3. A combination telescoping tractor and horse drawn hitch comprising a female tube, means for attaching a drawn vehicle to said tube, a male rod received in said female tube, means for locking said male rod to said tube after extension of the rod to provide a lengthened horse drawn tongue, means for engaging the rod with said tube when said rod is thrust into said tube, including a shouldered member attached to the end of said tube, a spring urged lever member including a shoulder engaging member attached to the rod, said rod including means for attachment to a tractor, said shouldered member having a sloping surface whereby inward thrusting of the rod will cause said shoulder engaging member to travel along said surface and to snap into locking engagement with said shouldered member, a grasping member attached to said spring urged lever member for providing release from said shoulder member.

4. A combination telescoping tractor hitch comprising a female tube, means for attaching a drawn vehicle to said tube, a male rod received in said female tube, means for engaging the rod with said tube when said rod is thrust into said tube, including a shouldered member attached to the end of said tube, a spring urged lever member including a shoulder engaging member attached to the rod, said rod including means for attachment to a tractor.

5. A combination telescoping tractor hitch comprising a female tube, means for attaching a drawn vehicle to said tube, a male rod received in said female tube, means for engaging the rod with said tube when said rod is thrust into said tube, including a shouldered member attached to the end of said tube, a spring urged lever member including a shoulder engaging member attached to the rod, said rod including means for attachment to a tractor, said shouldered member having a sloping surface whereby inward thrusting of the rod will cause said shoulder engaging member to travel along said surface and to snap into locking engagement with said shouldered member.

EDWARD M. O'DONNELL.

REFERENCES CITED

The following references are of record in the file of this patent:

UNITED STATES PATENTS

| Number | Name | Date |
| --- | --- | --- |
| 84,376 | Rexford | Nov. 24, 1868 |
| 360,009 | Goodyear | Mar. 29, 1887 |
| 526,219 | Clark | Sept. 18, 1894 |